Nov. 25, 1969   E. M. SMITH   3,480,355
PNEUMATICALLY POWERED REMOTE CONTROLLED MIRROR WITH
CONTROLLABLE LIMIT STOP
Filed Nov. 2, 1967   2 Sheets-Sheet 1

INVENTOR.
EDWARD M. SMITH
BY
ATTORNEYS

Nov. 25, 1969  E. M. SMITH  3,480,355
PNEUMATICALLY POWERED REMOTE CONTROLLED MIRROR WITH
CONTROLLABLE LIMIT STOP
Filed Nov. 2, 1967  2 Sheets-Sheet 2

INVENTOR.
EDWARD M. SMITH
BY
ATTORNEYS

United States Patent Office 3,480,355
Patented Nov. 25, 1969

3,480,355
PNEUMATICALLY POWERED REMOTE CONTROLLED MIRROR WITH CONTROLLABLE LIMIT STOP
Edward M. Smith, Hayward, Calif., assignor to Bigge Drayage Company, a corporation of California
Filed Nov. 2, 1967, Ser. No. 680,067
Int. Cl. G02f 3/00; F01b 9/02
U.S. Cl. 350—289                    1 Claim

ABSTRACT OF THE DISCLOSURE

A remote controlled mirror is driven by a pneumatic powered piston rod. An arm attached to the piston rod connects to the mirror to accomplish movement of the mirror. Controls are remote from the mirror. A remote controlled stop limits the stroke of the piston.

BACKGROUND OF THE INVENTION

Field of the invention

A remote controlled mirror is provided for use with trucks and the like having the controls close to the driver so that the mirror may be easily adjusted when sharp turns have to be made or intersections which are Y in shape have to be crossed.

Description of the prior art

A patentability search was carried out prior to the writing of this application and the following patents were found: 2,330,444; 2,696,142; 2,873,647; 2,897,726; 2,988,957.

The mirrors in these patents are either adjusted by means of a cable, a pair of cables, a pair of hydraulic cylinders or a mechanism attached to the steering shaft of the vehicle. In contrast, applicant in the present application moves the mirror by means of a pnuematic piston rod and provides a control regulating the amount of movement by means of a cable.

The drivers of trucks are ofttimes severely limited in the amount of rear view vision which they can obtain

SUMMARY OF THE INVENTION during the manipulation of a semi-trailer truck or the like. When such a truck is loaded the height of the load or the trailer itself is usually of sufficient height that an inside rear view mirror becomes meaningless. Even when not pulling a trailer there is a problem as many truck cabs have a sleeping arrangement therein which also serves to hamper the usefulness of any rear view mirror located inside the truck cab.

While outside stationary rear view mirrors on both the left and righthand sides of the truck cab have been employed and in many states are required by statute, the effectiveness of the stationary mirrors in some situations is severely impaired. When making a sharp righthand or lefthand turn, the mirror attached to the truck cab will assume the same angle relative to the trailer as is assumed by the cab. This is not a critical problem on the lefthand side of the cab as the driver, if he wishes, can merely open the window, lean out and see the entire length of the trailer. This however is impossible on the righthand side of the cab. The stationary mirror on the righthand side of the cab, when the truck is being turned to the right, will necessarily reflect back to the middle of the trailer. Thus, there is no way the driver can tell exactly the position of the rear of his load.

Previous attempts to provide a workable remote controlled mirror have not proven entirely satisfactory. The use of cables attached to the mirror, as shown in the patents to Clark, Park and Langford, do not allow a quick, accurate adjustment of the mirror with a minimum of effort on the part of the driver. The device of Kotora which uses a gear arrangement attached to the steering shaft is totally unacceptable when the truck is at a Y-intersection or in some other situation where the mirror must be adjusted to a wide angle away from the truck body. Likewise the twin cylinder hydraulic fluid arrangement of Bach has lent itself to frequent mechanical breakdowns and has proven particularly ineffective in severe cold weather when the hydraulic fluid becomes very viscous, which in turn causes the piston rods to be inoperative.

Applicant has overcome all of the above-described disadvantages by providing a pneumatic operated remote controlled mirror wherein a cable is attached to the piston rod arm to control the movement of the mirror.

It is the primary object of the present invention to provide a new and improved remote controlled mirror.

It is another object of the present invention to provide a remote controlled mirror which will operate in and under all types of weather conditions.

It is a further object of the present invention to provide a device of the character described which can be quickly and effortlessly adjusted to the angle desired.

It is a further object of the present invention to provide a remote controlled mirror which is easy to manufacture, economical in price, and capable of long extended usage without mechanical breakdown.

DESCRIPTION OF THE PREFERRED EMBODIMENTS

Figure 2:
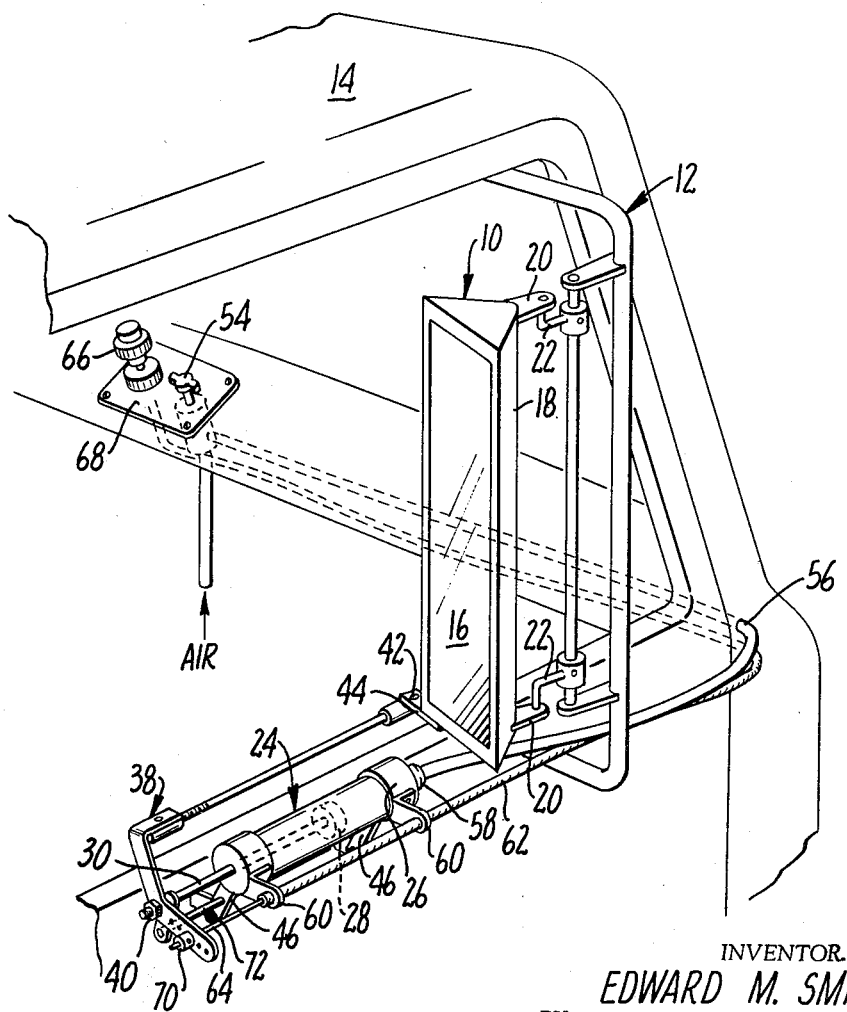
FIGURE 2 is a fragmentary perspective view showing the attachment of the piston rod arm to the mirror and the controls for the piston rod inside the truck cab.

Referring particularly to FIGURE 2, a remote controlled mirror, generally designated 10, is illustrated which is intended for use in many transportation operations, as for example, with trucks, truck cabs, cranes, dericks, etc. The remote controlled mirror 10 is provided with and mounted on a frame, generally indicated 12, which is attached to a vehicle 14. The mirror itself has a reflecting portion 16, a body portion 18, and members 20 which join with members 22 of the frame 12 to allow the mirror to rotate as will be described further herein.

Figure 3:
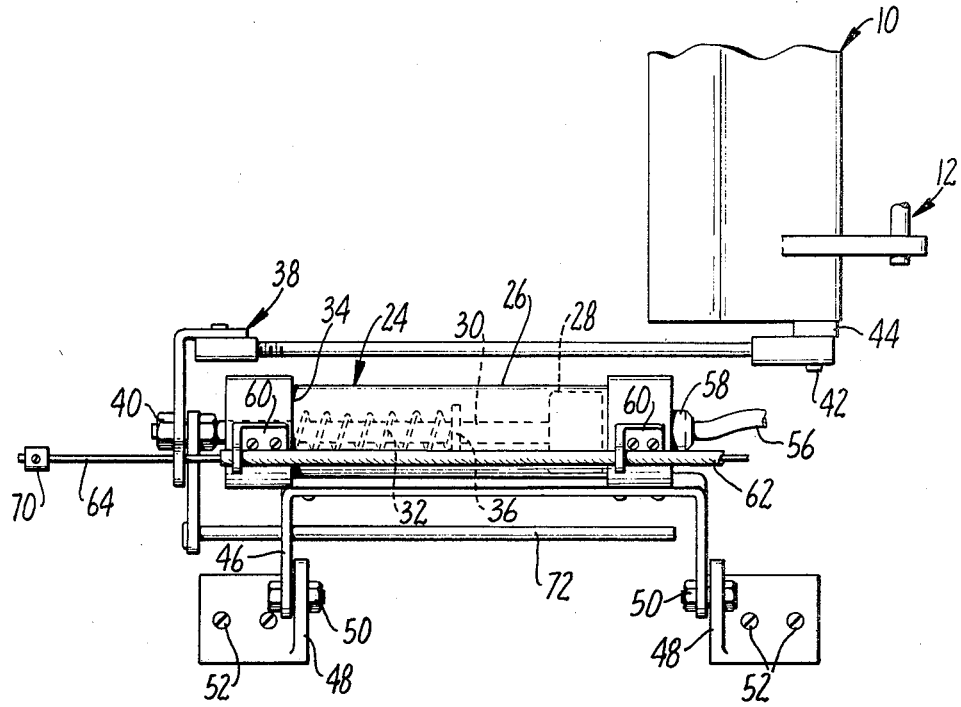
FIGURE 3 is a side elevational view showing the piston and cylinder device in detail with the inside of the cylinder shown in dotted outline.

A piston and cylinder device, generally indicated 24, has a cylinder 26 which contains a piston 28, a piston rod 30 mounted for longitudinal movement and coiled spring 32 (FIGURE 3) which is positioned between cylinder wall 34 and spring retainer 36 and serves to return the piston rod to normally retracted position. A somewhat L-shaped arm 38 is attached to the outer end of piston rod 30 by bolt 40 and links the piston rod 30 with the mirror 10 at pivot point 42 where the arm 38 is pivoted to member 44 attached to the mirror.

Figure 4:
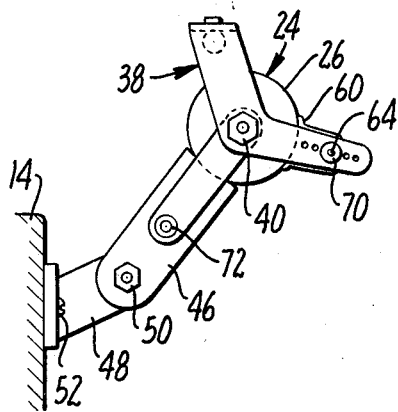
FIGURE 4 is a side elevational view showing the cylinder attached to the truck.

As seen in FIGURE 4, the cylinder 26 is attached to the side of the vehicle 14 by means of brackets 46 and support members 48. Bolts 50 connect bracket 46 with support member 48 and appropriate means 52 securely attach support member 48 to the side of the vehicle 14. Power for the piston and cylinder device 24 is supplied from the compressed air reservoir carried by trucks and used for the air brakes, which air passes through a regulator (not shown) to reduce the pressure down to between five to ten pounds per square inch. The air then leaves regulator, goes through control member 54 and through air line hose 56 which connects with the cylinder 26 at coupling 58.

Brackets 60 on cylinder 26 support a Bowden wire which includes a flexible conduit 62 which extends to the interior of the vehicle 14. Inside the flexible conduit 62 is cable 64 which extends from control knob 66 on panel 68 inside the vehicle, the cable extending slidably through the conduit and through arm 38 and terminates in enlarged member 70 which acts as a stop to limit the travel of arm 38.

Figure 1:
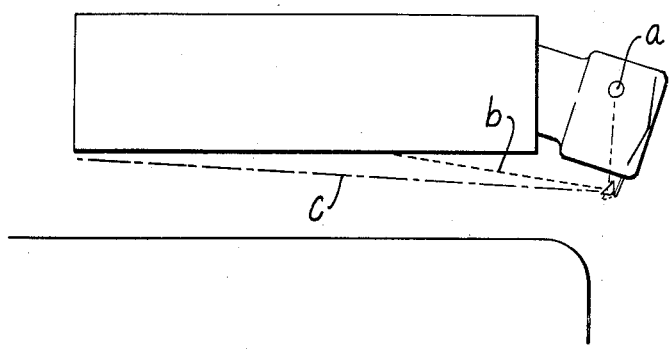
FIGURE 1 is a top plan view of a truck about to make a sharp righthand turn.

In actual operation and referring to FIGURE 1 of the drawings, the driver a of the vehicle needs to adjust the mirror during a turn. A stationary mirror as previously discussed will allow the driver a to see in the direction of line b. In this position the mirror reflects into the side of the trailer and is obviously very unsatisfactory so the mirror must be adjusted so that the driver a sees along line c to the end of the vehicle or the payload. To do this knob 66 is manipulated to extend cable 64 having enlarged portion 70 to a predetermined distance. Air control 54 is then turned so that air goes into the cylinder 26 and moves the piston rod 30 and thus the arm 38, out to where it meets enlarged portion 70 of the cable. Enlarged portion 70 limits the amount of movement. Arm 38 in turn through pivot point 42 rotates the mirror. Depending upon the kind of control knob 66 used, vernier adjustments can be made by rotating the knob 66 and the larger adjustments can be made by pulling the knob 66 either in or out. Rod 72 is provided to give balanced longitudinal movement of the piston rod 30.

It can thus be seen that the remote controlled mirror of this invention provides controls 66 and 54 on control panel 68 which is located adjacent the driver, which controls can be easily and quickly activated to adjust the mirror 10.

The foregoing detail description has been given for clearness of understanding only and no unnecessary limitation should be understood therefrom for some modifications will be obvious to those skilled in the art.

I claim:
1. A remote controlled mirror mounted on a vehicle having a driver's compartment and comprising:
   (a) a frame mounted on the side of the vehicle;
   (b) a mirror mounted in the frame for rotation relative to the vehicle for viewing from such driver's compartment;
   (c) a piston and cylinder structure mounted on the side of the vehicle having a piston rod extending therefrom;
   (d) an arm secured on the end of the piston rod and having a link extending therefrom to the mirror to move the mirror as the piston rod is moved;
   (e) control means in the driver's compartment for selectively supplying a fluid under pressure to the cylinder to move the piston;
   (f) a flexible cable extending from the driver's compartment and having one end thereof projecting slidably through the arm;
   (g) a stop on the projecting end of the flexible cable to limit movement of the piston rod;
   (h) and means in the driver's compartment for moving the flexible cable selectively.

References Cited
UNITED STATES PATENTS 2,758,508    8/1956    Petri et al.
3,274,903    9/1966    Fischer et al. _____ 92—13

DAVID SCHONBERG, Primary Examiner
ROBERT L. SHERMAN, Assistant Examiner

U.S. Cl. X.R.
92—13